3,520,922
Patented July 21, 1970

3,520,922
PHENOXYPHENYLAMINO ACIDS
Hans A. Wagner, Skokie, Ill., assignor to G. D. Searle & Co., Chicago, Ill., a corporation of Delaware
No Drawing. Filed Sept. 7, 1967, Ser. No. 665,993
Int. Cl. C07c *101/72*
U.S. Cl. 260—519                                                    7 Claims

ABSTRACT OF THE DISCLOSURE

Preparation of the captioned compounds, such as N-(p-phenoxyphenyl)glycine and N-nitroso-N-(p-phenoxyphenyl)glycine, and their valuable pharmacological properties, including anti-microbial and anti-inflammatory activities, are disclosed.

---

This invention relates to phenoxyphenylamino acids and processes for the preparation thereof. More particularly, this invention provides new, useful, and unobvious chemical compounds of the formula

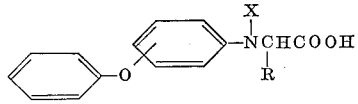

wherein X represents hydrogen or a nitroso radical and R represents hydrogen or an alkyl or phenyl radical.

Among the alkyl radicals represented by R, lower alkyl groupings are preferred, i.e., methyl, ethyl, propyl, isopropyl, butyl, sec-butyl, tert-butyl, pentyl, neopentyl, hexyl, isohexyl, heptyl, and like monovalent, saturated, acyclic straight- or branched-chain, hydrocarbon radicals of empirical formula $$-C_nH_{2n+1}$$

wherein $n$ represents a positive integer less than 8. Although the phenoxy constituents of the instant compounds can, for the purposes of this invention, be in any of the positions ortho, meta, and para to the nitrogen atom as shown in the introductory formula, the para position is the position of choice.

The compounds to which this invention relates are useful by reason of their valuable pharmacological properties. Thus, for example, they inhibit the growth of bacterica such as *Diplococcus pneumoniae*, protozoa such as *Tetrahymena gelleii*, and fungi such as *Trichophyton mentagrophytes;* and they are anti-infammatory agents. In addition, the nitroso compounds hereof inhibit the growth of the fungus, *Candida albicans,* and algae such as *Chlorella vulgaris*.

The anti-inflammatory activity of the instant compounds is evident from the results of a standardized test for their capacity to diminish or prevent the edema induced in rats by injection of carrageenin. The rationale for this test is that formation of local edema is a characteristic manifestation of inflammation which can be counteracted by known anti-inflammatory agents. The procedure is a modification of one described by Winter et al., Proc. Soc. Exper. Biol. and Med., 111, 544 (1962). Compound is administered subcutaneously or intragastrically, dissolved or suspended in 0.5 ml. of aqueous 0.86 sodium chloride, propylene glycol, a mixture of these vehicles, or corn oil, to each of 10 male rats weighing 100–130 gm. A like group of rats to which is identically and concurrently administered vehicle alone serves as controls. Precisely 1 hr. later, each animal is injected under the plantar surface of each hind foot with 0.1 ml. of an aqueous 1% solution of carrageenin (Marine Colloids, Inc., Type 402). A compound is considered anti-inflammatory if the average total circumference (T) of the hind feet in the group treated therewith, which is measured in arbitrary units 5 hr. after the carrageenin injection, is significantly ($P \leq 0.05$) less than the corresponding value (C) for the control group. Results of the testing of the products of Examples 1 and 2 hereinafter by this procedure are shown in Table I.

TABLE I

| Product: | Dose, mg. | Route | C | T | C–T | Conclusion |
|---|---|---|---|---|---|---|
| Ex. 1 | 5 | Oral | 102.0 | 98.6 | 3.4 | Anti-inflammatory. |
| Ex. 2 | 25 | Subcut | 103.2 | 98.1 | 5.1 | Do. |

Those skilled in the art will recognize that observations of activity in standardized tests for particular pharmacological effects as hereinbefore set forth are fundamental to the development of valuable new drug products, both veterinary and human.

Preparation of the compounds of this invention proceeds by heating an appropriate phenoxyaniline

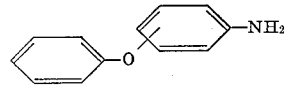

and α-halo carboxylic acid

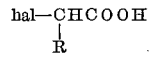

(hal representing chlorine or bromine and R being defined as before) in an inert, alkaline, solvent medium, such as aqueous ethanol or 2-methoxyethanol containing excess sodium hydroxide and/or sodium methoxide, to give the corresponding amino acid

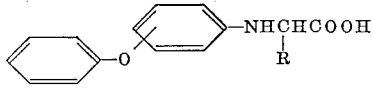

(R being defined as before). The latter compound, suspended in water or—preferably—dissolved in hydrochloric acid, affords the corresponding nitroso compound hereof on contact with an aqueous solution of sodium nitrite.

The following examples describe in detail compounds illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

Example 1.—N-(phenoxyphenyl)glycine

To a solution of 92 parts of p-phenoxyaniline in 500 parts of ethanol is added 47 parts of chloroacetic acid, followed by a solution of 20 parts of sodium hydroxide in 500 parts of water. The resultant mixture is heated at the boiling point under reflux with stirring for 12 hours during which solution occurs. It is then poured into 2000 parts of water. The crystalline solid which forms is filtered off and taken up in a solution of 75 parts of sodium hydroxide in 1500 parts of water. The resultant solution is filtered, washed with ether, and then acidified with 250 parts of acetic acid. The solid thus obtained is filtered off, washed with water, dried in air, and recrystallized from ether to give N-(p-phenoxyphenyl)glycine melting at 110–112°. The product has the formula

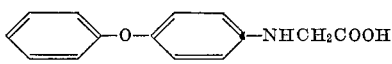

Example 2.—N-nitroso-N-(p-phenoxyphenyl)glycine

To a suspension of 24 parts of N-(p-phenoxyphenyl)glycine in 300 parts of water is added 9 parts of sodium nitrite. On stirring, solution occurs. After 2 hr., the solution is filtered through diatomaceous earth, treated with decolorizing charcoal, and filtered again. To the filtrate is added 20 parts of concentrated hydrochloric acid. The crystalline precipitate which forms is filtered out, washed with water, dried in air, and recrystallized from a mixture of ether and n-pentane to give N-nitroso-N-(p-phenoxyphenyl)glycine melting at approximately 97–98°. The product has the formula

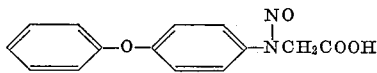

Example 3.—N-(p-phenoxyphenyl)alanine

Substitution of 76 parts of 2-bromopropionic acid, 400 parts of ethanol, and 400 parts of water for the 47 parts of chloroacetic acid, 500 parts of ethanol, and 500 parts of water, respectively, called for in Example 1 affords, by the procedure there detailed, N-(p-phenoxyphenyl)alanine melting at approximately 151–152°. The product has the formula

Example 4.—N-nitroso-N-(p-phenoxyphenyl)alanine

To a solution of 70 parts of N-(p-phenoxyphenyl)alanine in 500 parts of 5% hydrochloric acid at 5° is slowly added, during 20 minutes, a solution of 25 parts of sodium nitrite in 40 parts of water. After 1 hr., a crystalline precipitate is thrown down which, filtered off, washed with water, dried in air, and recrystallized from a mixture of ether and n-pentane, affords N-nitroso-N-(p-phenoxyphenyl)alanine melting at approximately 89–90°. The product has the formula

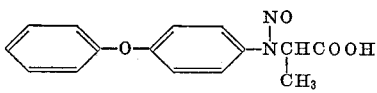

Example 5.—N-(p-phenoxyphenyl)valine

A solution of 148 parts of p-phenoxyaniline and 72 parts of 2-bromoisovaleric acid in 400 parts of 2-methoxyethanol (Methylcellosolve) is heated at the boiling point under reflux with agitation for 18 hr., whereupon 40 parts of sodium hydroxide is introduced and the resultant mixture steam-distilled to remove solvent. The distilland is chilled and washed well with dichloromethane and then with ether. Upon addition of 100 parts of acetic acid thereto, a crystalline precipitate is thrown down which, filtered off, washed with cold water, dried in air, and recrystallized from ether, affords N-(p-phenoxyphenyl)valine melting at approximately 109–110°. The product has the formula

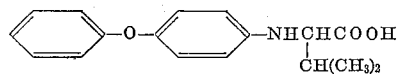

Example 6.—α-Pentyl-N-(p-phenoxyphenyl)glycine

Substitution of 83 parts of 2-bromoheptanoic acid for the 2-bromoisovaleric acid called for in Example 5 affords, by the procedure there detailed, α-pentyl-N-(p-phenoxyphenyl)glycine, having the formula

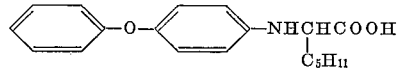

Example 7.—α-Heptyl-N-(p-phenoxyphenyl)glycine

Substitution of 94 parts of 2-bromononanoic acid for the 2-bromoisovaleric called for in Example 5 affords, by the procedure there detailed, α-heptyl-N-(p-phenoxyphenyl)glycine. The product has the formula

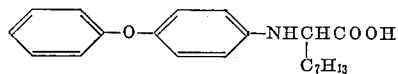

Example 8.—N-(p-phenoxyphenyl)-α-phenylglycine

A mixture of 172 parts of p-phenoxyaniline, 200 parts of α-bromophenylacetic acid, 51 parts of sodium methoxide, and 1000 parts of 2-methoxyethanol is heated at the boiling point under reflux with agitation for 8 hr. Approximatly 40 parts of sodium hydroxide is thereupon introduced and the resultant mixture steam-distilled to remove solvent. The distilland is cooled and washed well with dichloromethane and ether, then acidified with 100 parts of acetic acid. The mixture thus obtained is stirred while a solid precipitates, which is filtered off, washed with water, dried in air, and recrystallized from acetone to give N-(p-phenoxyphenyl)-α-phenylglycine melting at 168–170°. The product has the formula

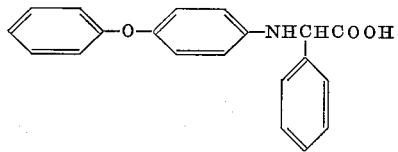

What is claimed is:
1. A compound of the formula

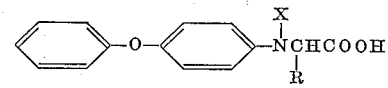

wherein X represents hydrogen or nitroso and R represents hydrogen, lower alkyl, or phenyl.

2. A compound according to claim 1 which is N-(p-phenoxyphenyl)glycine.

3. A compound according to claim 1 which is N-nitroso-N-(p-phenoxyphenyl)glycine.

4. A compound according to claim 1 wherein R represents lower alkyl.

5. A compound according to claim 1 which is N-(p-phenoxyphenyl)alanine.

6. A compound according to claim 1 which is N-nitroso-N-(p-phenoxyphenyl)alanine.

7. A compound according to claim 1 which is N-(p-phenoxyphenyl)-α-phenylglycine.

References Cited

UNITED STATES PATENTS 3,410,891  11/1968  Hughes et al. _____ 260—519

LORRAINE A. WEINBERGER, Primary Examiner

L. A. THAXTON, Assistant Examiner

U.S. Cl. X.R.

424—319